(12) United States Patent
Sundaresan et al.

(10) Patent No.: US 9,479,422 B2
(45) Date of Patent: Oct. 25, 2016

(54) MDNS-DNS ARCHITECTURE

(71) Applicant: Cable Television Laboratories, Inc., Louisville, CO (US)

(72) Inventors: Karthik Sundaresan, Boulder, CO (US); Christopher Donley, Broomfield, CO (US); Christopher Grundemann, Denver, CO (US); Vikas Sarawat, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 622 days.

(21) Appl. No.: 13/836,948

(22) Filed: Mar. 15, 2013

(65) Prior Publication Data

US 2014/0269703 A1    Sep. 18, 2014

(51) Int. Cl.
*H04L 12/24*    (2006.01)
*H04L 12/715*    (2013.01)
*H04L 29/08*    (2006.01)
*H04L 29/12*    (2006.01)
*H04L 12/761*    (2013.01)

(52) U.S. Cl.
CPC ........... *H04L 45/04* (2013.01); *H04L 61/1511* (2013.01); *H04L 67/16* (2013.01); *H04L 45/16* (2013.01)

(58) Field of Classification Search
CPC ............. H04L 47/2408; H04L 61/157; H04L 61/2023; H04L 61/2092
USPC .................. 370/329, 390; 709/203, 245
See application file for complete search history.

(56) References Cited

U.S. PATENT DOCUMENTS

| | | | |
|---|---|---|---|
| 7,467,214 B2 * | 12/2008 | Chin | 709/230 |
| 7,779,091 B2 * | 8/2010 | Wilkinson et al. | 709/220 |
| 8,050,267 B2 * | 11/2011 | Townsley et al. | 370/392 |
| 2004/0083306 A1 * | 4/2004 | Gloe | H04L 29/12066 709/245 |
| 2008/0034071 A1 * | 2/2008 | Wilkinson | G06F 9/505 709/220 |
| 2008/0198858 A1 * | 8/2008 | Townsley et al. | 370/401 |
| 2009/0252063 A1 * | 10/2009 | Owen et al. | 370/255 |
| 2010/0205628 A1 * | 8/2010 | Davis et al. | 725/25 |
| 2010/0233960 A1 * | 9/2010 | Tucker et al. | 455/41.2 |
| 2011/0010463 A1 * | 1/2011 | Christenson | H04L 29/12066 709/245 |
| 2011/0158088 A1 * | 6/2011 | Lofstrand et al. | 370/229 |
| 2012/0036233 A1 * | 2/2012 | Scahill et al. | 709/220 |
| 2014/0052984 A1 * | 2/2014 | Gupta | H04W 12/06 713/162 |

\* cited by examiner

*Primary Examiner* — Edan Orgad
*Assistant Examiner* — Emmanuel Maglo
(74) *Attorney, Agent, or Firm* — Great Lakes Intellectual Property, PLLC.

(57) ABSTRACT

An architecture, such as but not necessarily limited to an architecture sufficient to facilitate service discovery within a network having two or more local area networks (LANs), is contemplated. The architecture may be employed in a router, gateway or other device configured to facilitate signaling between multiple routed networks, such as to facilitate service discovery across multiple routed networks.

12 Claims, 6 Drawing Sheets

MDNS-DNS ARCHITECTURE

TECHNICAL FIELD

The present invention relates to architectures, such as but not necessarily limited to architectures sufficient to facilitate service discovery within a network having two or more local area networks (LANs).

BACKGROUND

A multi-router network may be characterized as a network having a plurality of routers connected together and arranged in a logical hierarchy. With the launch of new services, such as but not limited to home security, IP video, Smart Grid, etc., and more consumer devices being configured with routers, such as but not limited to televisions, mobile phones, appliances, etc., multi-router networks are becoming more prevalent. Multi-router networks require multiple routers to communicate with each other over network links in order to facilitate the establishment of service discoveries, messaging protocols, hierarchical relationships, address assignments, prefix delegations, security measures, backup capabilities and a potential number of additional functional capabilities needed for desirable network communications. As the prevalence of such multi-router networks continues to grow, one non-limiting aspect of the present invention contemplates a need to facilitate configuring gateways, routers and other devices to operate in in such a complex environment.

The multi-router network may include a plurality of links, subnets or local area networks (LANs) where the number of such network segments may vary depending on the particular hierarchal relationship between the inter-connected routers. Within a home or other likely location for such multiple-router networks, a Domain Name System (DNS) server may be utilized for the purpose of discovering services available on devices connected to the various networks and optionally to facilitate resolving names for the devices offering services. Some devices within the multi-router network may be limited to supporting LAN-only service discovery protocols, such as but not necessary limited to multicast DNS (mDNS) and Bonjour. These limitations may prevent those devices from advertising services or otherwise facilitating service discovery across multiple routed networks, i.e., the various links, subnets and LANs comprising the multi-router network. Accordingly, one non-limiting aspect of the present invention contemplates facilitating service discovery across multiple routed networks when one or more devices are unable to facilitate non-LAN-only service discovery protocols.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
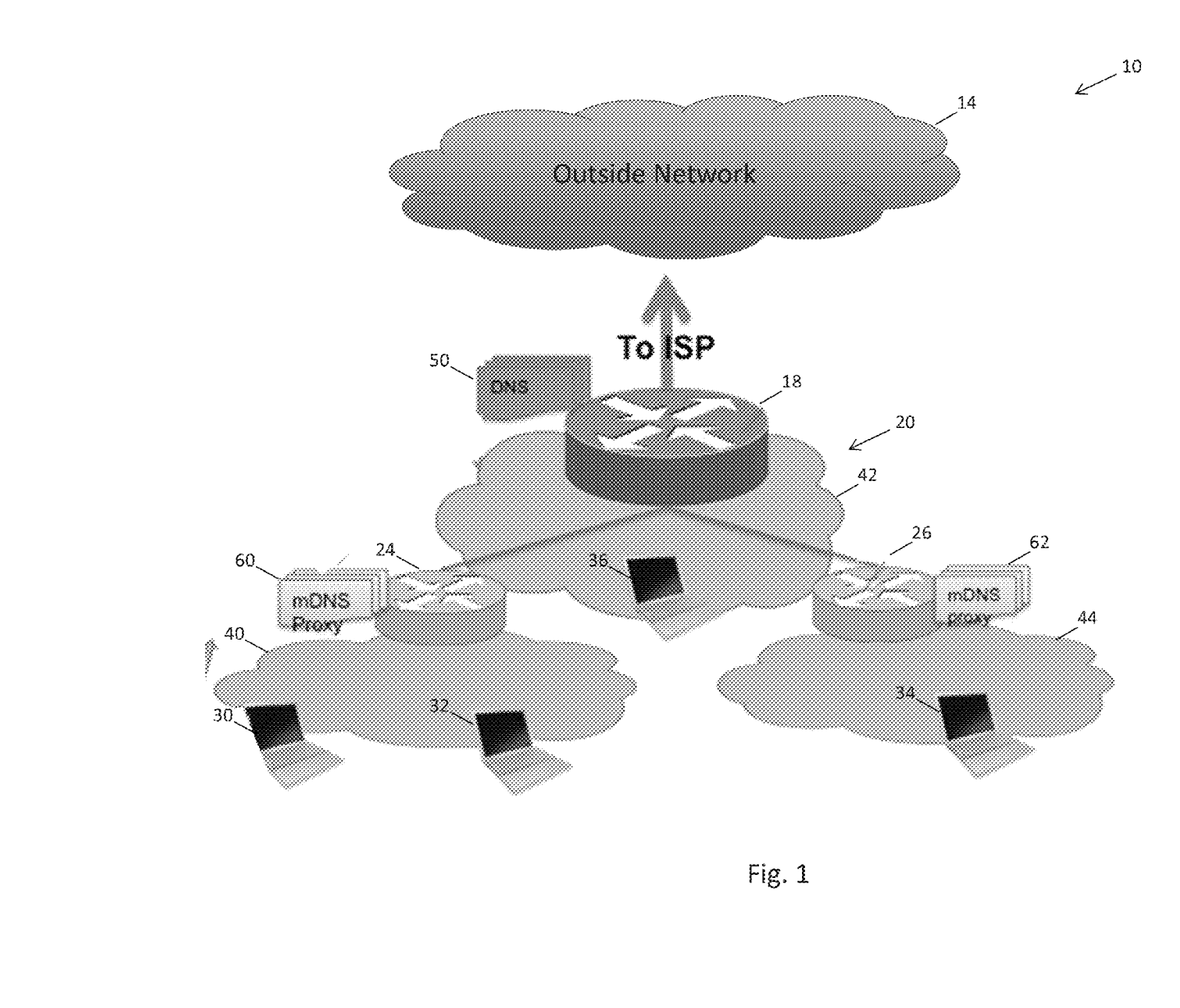
FIG. 1 illustrates a router system in accordance with one non-limiting aspect of the present invention.

FIG. 1 illustrates a router system 10 in accordance with one non-limiting aspect of the present invention. The system 10 illustrates one exemplary configuration where a delegating router (not shown) associated with an outside network 14 provides a prefix to a requesting router 18 for delegation within an inside network 20. The prefix may be any suitable addressing prefix, such as but not necessarily limited to an Internet Protocol version 6 (IPv6) prefix and an Internet Protocol version 4 (IPv4) prefix. The present invention is predominately described with respect to use of IPv6 without necessarily intending to limit the scope of the present invention. Dynamic Host Configuration Protocol (DHCP), such as that described in Internet Engineering Task Force (IETF) request for comment (RFC) 2131, 3315 and 3633, the disclosures of which are hereby incorporated by reference in their entireties, or other suitable delegation processes may be employed to facilitate delegating the first prefix to the requesting router 18. The requesting router 18 may be configured to facilitate adaptively delegating the prefix to additional routers associated with the inside network 20, such as in the manner described in U.S. patent application Ser. No. 13/783,242, the disclosure of which is hereby incorporated by reference in its entirety.

The outside network 14 and the inside network 20 demonstrate one exemplary, non-limiting use of the present invention where a multiple system operator (MSO), Internet service provider (ISP) or other type of service provider is allocated a prefix or addressing domain by a suitable addressing entity to facilitate Internet-based messaging or other network-based messaging. The inside network 20 is shown to be distinguished from the outside network 14 to demonstrated one use case where an MSO may be tasked with facilitating messaging for a plurality of inside networks, such as but not necessarily limited to home networks or other internal networks associated with its subscribers. While only one inside network 20 is illustrated, the MSO may be responsible for facilitating prefix delegation with any number of inside networks or other downstream connected networks. The requesting router 18 may be periodically referred to herein as a customer edge router (CER) or edge router (ER) and routers connected downstream thereof may be periodically referred to herein as internal routers (IRs) 24, 26. Optionally, the ER 18, IRs 24, 26 and/or devices 30, 32, 34, 36 may be configured to receive multiple prefixes, such as in the manner described in U.S. patent application Ser. No. 13/754,954, the disclosure of which is hereby incorporated by reference in its entirety.

The ER 18 and IRs 24, 26 may be configured to comply with RFC 6204, RFC 6204BIS, and IPv4 and IPv6 eRouter Specification (CM-SP-eRouter-I08-120329), the disclosures of which are hereby incorporated by reference in their entirety. The ER 18 and IRs 24, 26 may also be configured to facilitate various operations, such as adaptive prefix delegation, role based router functionality, interface directionality assignment and/or overly networking, such as in the manner described in U.S. patent application Ser. Nos. 61/712,318, 61/771,807, 13/783,242, 13/792,023, 13/792, 016 and 13/652,700, the disclosures of which are hereby incorporated by reference in their entireties. The ER 18 and IRs 24, 26 are shown for exemplary non-limiting purposes to be arranged in a logical hierarchy where a first layer is associated with the ER 18 and a second layer is associated with the first IR 24 and the second IR 26, thereby providing a multi-network environment inside of the ER 18 comprising a first LAN 40, a second LAN 42, and a third LAN 44. The ER 18 and IRs 24, 26 are shown to facilitate multiple-networks defined by the first, second, and third LANs 40, 42, 44 for exemplary non-limiting purposes as the present invention fully contemplates the inside network comprising any number of additional IRs 24, 26 and corresponding LANs 40, 42, 44, links, subnets and/or networks.

The ER 18 is shown to include a Domain Name System (DNS) server 50 and/or resolver configured to facilitate DNS related messaging over at least the inside network 20. The ER 18 may be configured to facilitate the DNS capabilities described in RFCs 1032, 1034 and 1035, the disclosure of which are hereby incorporated by reference in their entireties. As noted in RFC 1035, the contemplated DNS capabilities may be used to provide a mechanism for naming resources in such a way that the names are usable in different hosts, networks, protocol families, internets, and administrative organizations. The domain names may be useful as arguments to a local agent (e.g., ER 18), commonly called a resolver or name server, which retrieves information associated with a corresponding domain name. In this manner, a device 30, 32, 34, 36 might ask for the host address (e.g., IPv4 and/or IPv6 address) or other information associated with a particular domain name. To enable the device 30, 32, 34, 36 to request a particular type of information, an appropriate query type may be passed to the ER 18 with the domain name, e.g. a DNS query or DNS message. The ER 18 may include a name server, database, etc. to store DNS resource records (RR), which may be arranged according to zones, optionally where each zone may be a complete database for a particular subtree or subnet of the domain space (e.g. each LAN 40, 42, 44). The devices 30, 32, 34, 36 connected to the various LANs 40, 42, 44 may issue DNS queries to retrieve addressing, services and other information from other devices 30, 32, 34, 36 connected to the inside network 20. Optionally, the DNS queries may include identifying information, hop restrictions, etc. to ensure corresponding DNS responses are limited to devices connected within the ER 18.

Figure 2:
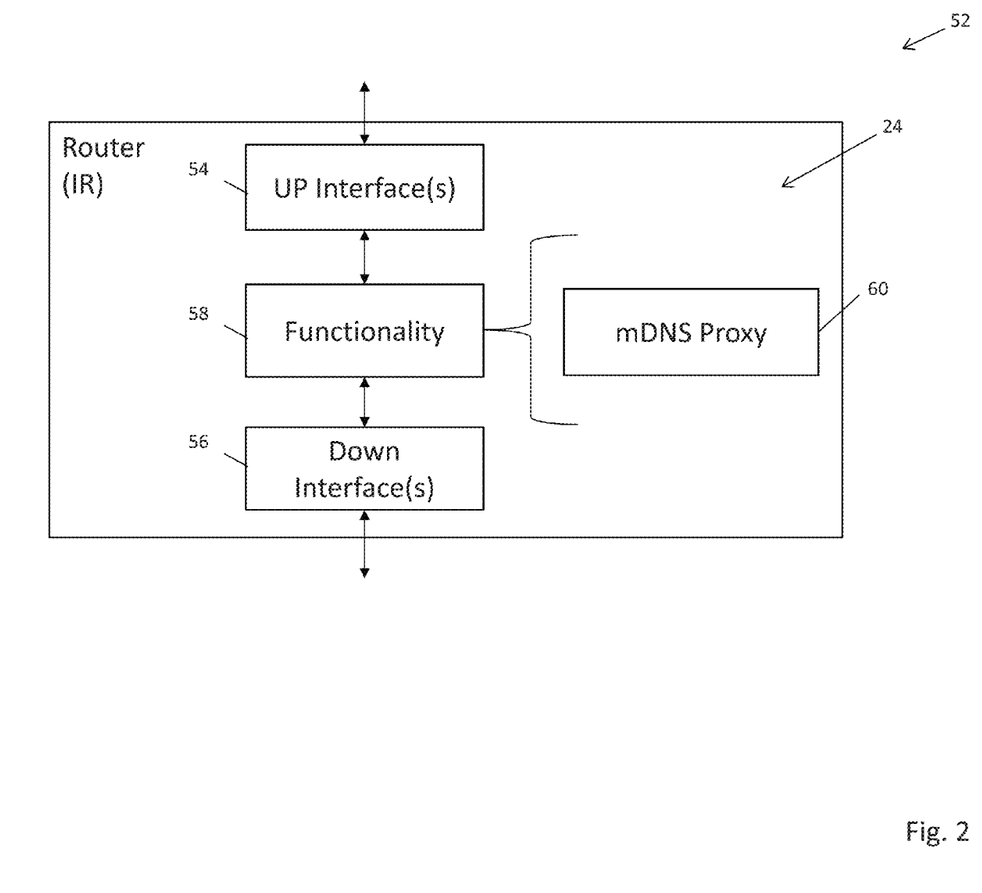
FIG. 2 illustrates a gateway architecture in accordance with one non-limiting aspect of the present invention.

FIG. 2 illustrates a gateway architecture 52 as contemplated by one non-limiting aspect of the present invention. The gateway architecture is shown with respect to a router (IR) 24 being configured with one or more up interfaces 54 and one or more down interfaces 56 where the interfaces 52, 56 may be configured to facilitate routing therebetween according programmed functionality 58. The IR 24 may include a multicast DNS proxy 60 or other feature sufficient to facilitate mDNS capabilities and operations contemplated by the present invention (the second IR 26 may include a similar mDNS proxy 62). The mDNS capabilities may correspond with those described in RFC 6762, the disclosure of which is hereby incorporated by reference in its entirety. As noted in RFC 6762, mDNS capabilities may be used to enable how devices send DNS-like queries via IP multicast, and how devices cooperatively collect answers to those queries in a useful manner. The mDNS capabilities, for example, may be used to facilitate service discovery and service advertisement for locally connected devices. The mDNS related operations may be characterized as a LAN-only service discovery protocol since the corresponding discovery messages are limited to communications over the connected-to LAN, e.g., a first device 30 connected to the first LAN 40 is able to multicast an mDNS message to the second device 32 connected to the first LAN 40 but unable to multicast a similar mDNS message to the third device 34 connected to the third LAN 44, at least without the message conversion contemplated by the present invention. One non-limiting aspect of the present invention contemplates converting an mDNS message to a DNS message suitable for communication to the ER 18 whereby the information in the mDNS message may thereafter be made available through DNS to the third device 34 or other devices connected to other LANs 42, 44 and/or networks of the inside network 20.

The mDNS proxy 60, 62 may be configured to facilitate converting mDNS messages to suitable DNS messages. The mDNS proxy 60, 62 may then transmit the DNS message to the DNS server 50 in order to facilitate creation of a corresponding RR, which may then be utilized by the DNS server using a suitable DNS messaging to convey information included in the mDNS message to devices 30, 32, 34, 36 connected to other networks 40, 42, 44. The mDNS proxy 60, 62 may transmit the converted mDNS message to the DNS server 50 using dynamic DNS (DDNS), such as in the manner described in RFC 2136, the disclosure of which is hereby incorporated by reference in its entirety. While the mDNS proxy 60, 62 is shown to facilitate converting mDNS messages to DNS and/or DDNS messages, the present invention is not necessary limited to the use of an mDNS proxy 60, 62 and/or converting mDNS messages to DNS or DDNS messages as other suitable devices and conversions may be implemented without deviating from the scope and contemplation of the present invention. The mDNS proxy 60, 62, or other feature of the IRs 24, 26, may include a database (not shown) suitable for storing parameters associated with the mDNS messages and from which DNS and/or DDNS messages may be mapped, such as using a mapping tool other logical functioning element. Optionally, a computer program product or a computer-readable medium having non-transitory instructions stored thereon, which may be operable with a processor, may be used to facilitate the contemplated message conversion.

Figure 3:
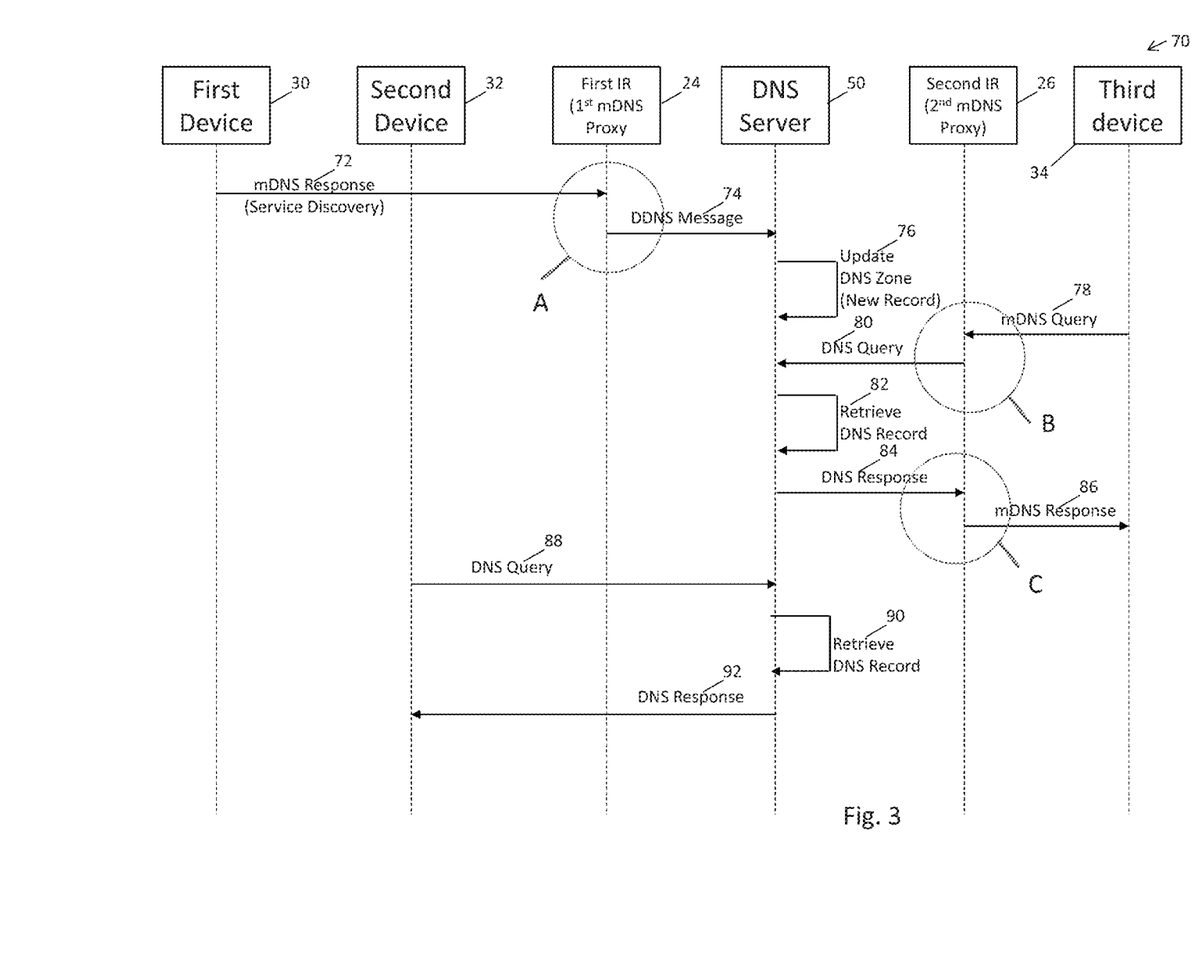
FIG. 3 diagrammatically illustrates an mDNS-DNS conversion in accordance with one non-limiting aspect of the present invention.

FIG. 3 diagrammatically illustrates an operation 70 of the system 10 in accordance with one non-limiting aspect of the present invention. The operation 70 is shown with respect to an mDNS message 72 originating from a device, such as the first device 30, being converted with an mDNS proxy, such as the first mDNS proxy 32, to a DDNS message 74 suitable for transmission a DNS server, such as the DNS server 50 of the ER 18. The DNS server 50 may then parse the information included with the DDNS message 74, which may be a DDNS update message, to facilitate generation of a DNS message/record according to DDNS protocols. The DNS server 50 may then use the newly created and/or updated DNS record 76 to add a corresponding record to a DNS zone, such as to subsequently facilitate DNS-based distribution of the information stored therein to other devices 30, 32, 34, 36 within the inside network 20. The subsequent distribution is shown with respect to distributing the new record to the second device 32 and the third device 34 where the second device 32 is a DNS device and the third device 34 is an mDNS device, which is done for exemplary non-limiting purposes as the record may be distributed to other devices and/or devices not operationally limited to DNS or mDNS and/or the devices may be configured to support mDNS and DNS.

The third device 34 may request the new record with issuance of an mDNS query 78. The mDNS query 78 may be transmitted to the second IR 62 for processing with the included mDNS proxy 62 to facilitate transmission of a corresponding DNS query 80 to the DNS server 50. The DNS server 50 may then execute a process 82 to retrieve the corresponding DNS record (new record) from storage within a DNS zone. A following DNS response 84 may be generated and transmitted from the DNS server 50 to the second IR 26 for processing with the included mDNS proxy 62 to facilitate transmission of a corresponding mDNS response 86 to the third device 34. The mDNS response 34 to the third device 86 may include information desired when issuing the corresponding mDNS query 78. Similarly, the second device 32 may request the new record with issuance of a DNS query 88. The DNS query 88 may be bridged with the first IR 24 for processing at the DNS server 50. The DNS server 50 may execute a process 90 to retrieve the corresponding DNS record (new record) from within the DNS zone. The following DNS response 92 may be generated and transmitted from the DNS server 50 to the first IR 24 for bridging to the second device 32. The DNS response 92 to the second device 32 may include information desired when issuing the corresponding DNS query 88.

In this manner, one non-limiting aspect of the present invention contemplates facilitating service discovery of services advertised or otherwise originating using mDNS protocols across multiple routed networks, LANs, links and other inter-network boundaries through which the corresponding mDNS or other LAN-limited service discovery protocols would otherwise be unable to facilitate service discovery. The service discovery may be facilitated with mDNS-to-DNS and/or mDNS-to-DDNS conversions provided through the mDNS proxies and/or other devices suitably configured to facilitate the contemplated mDNS-DNS interactions. Particular conversions contemplated to facilitate service discovery advertisements, service discovery queries and service discovery responses are respectively reference with callouts A, B, C, which is described below in more detail.

Figure 4:
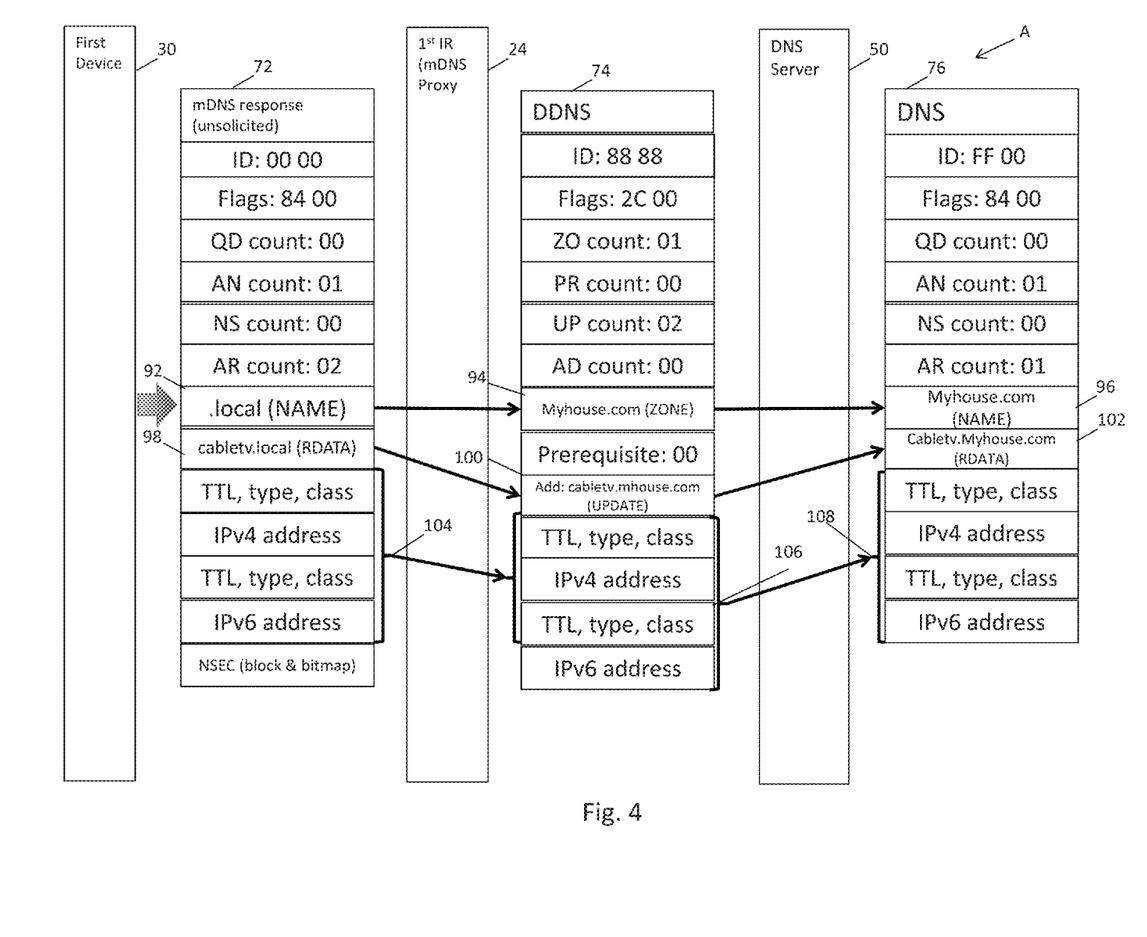
FIG. 4 illustrates an mDNS-to-DDNS conversion A as contemplated by one non-limiting aspect of the present invention.

FIG. 4 illustrates an mDNS-to-DDNS conversion A as contemplated by one non-limiting aspect of the present invention. The mDNS-to-DDNS conversion A may correspond with facilitating the operations associated with callout A when processing an unsolicited mDNS response 72 from the first device 30. The mDNS-to-DDNS conversion, for simplification, illustrates exemplary fields (rectangles) of the mDNS message 72 and the DDNS message 74 and a resulting DNS record being generated as a function of information included within the mDNS message 70 originating from the first device 30. The conversion may include: (1) mapping a name field 92 of the mDNS message 72 to an zone field 94 of the DDNS message 74 and finally to an name field 96 of the DNS record 76; (2) mapping an RDATA data field 98 of the mDNS message 72 to an update data field 100 of the DDNS message 74 and finally to an RDATA data field 102 of the DNS message 76; and (3) mapping an additional field 104 of the mDNS message to an additional data 106 field of the DDNS message 74 and finally to an additional field 108 of the DNS record 76.

The mapping associated with (1) may be used to apprise the DNS server 50 of domain names sufficient for use within the inside network 20 to locate the device originating the mDNS message 72. The mapping associated with (2) may be used to apprise the DNS server 50 of a service type, service name or other service related information sufficient to convey capabilities of the device originating the mDNS message 72. The mapping associated with (3) may be used to apprise the DNS server 50 of IP addresses and other information related to facilitating addressing based communications with the device originating the mDNS message 72, such as optionally with information within an answer RR. Additional data mapping may occur in the illustrated manner and/or other non-illustrated mappings may occur in accordance with the operational requirement mincing characteristics of the RF's referenced above (for simplicity some of information that may be mapped has been committed).

The zone data field 94 of the DDNS message 74 may be generated by substituting a network domain name of the inside network 20, which for exemplary non-limiting purposes is shown to be "myhouse.com", for a default name specified within the mDNS message 72 by the device 30, which is shown for exemplary non-limiting purposes to be ".local". The ".local" may be a local suffix selected by the first device 30 according to mDNS protocol requirements. The default or ".local" name assigned by the mDNS originating device 30 may be selected based on granted authority for the transmitting device to choose a hostname that is not already in use on the connected-to link, i.e., the first LAN 40. In the event of another device sharing the connected-to link is utilizing the same default suffix, a conflict resolution process may be performed in accordance with RFC 6762 to resolve the conflict and to ensure a single host name is chosen. In this manner, the corresponding domain name identified within the name data field 96 of the DNS record 76 may be generated by replacing the default mDNS name with the inside network name such that the resulting domain name is "myhouse.com".

The update data field 100 of the DDNS message 74 may be generated as a function of the RDATA field 98 of the mDNS message 76 and the network domain name of the inside network 20. The update data field 100 is shown for exemplary non-limiting purposes to be generated by appending the network domain name to default domain name specified within the RDATA field 98 of the mDNS message 72. The appending may be performed by removing the ".local" suffix portion of the RDATA field "cabletv.local" and appending the network domain name such that the resulting update field indicates "cabletv.my.house.com" as the name for the first device 30 and/or the service(s) being discovered from the first device 30. The resulting name may be used to populate an RDATA field 102 of the corresponding DNS record 76. The first mDNS proxy 60 may include a database other feature to facilitate storing the relationship between the information included in the RDATA field 98 of the mDNS message 72 and the update field 100 of the DDNS message 74, such as to facilitate re-conversion and/or sharing with other mDNS proxies 62.

The appending of the inside network domain name selected by the DNS server 50 with the default host name selected by the first device 30 may be beneficial in providing the first device 30 originating the mDNS message 72 a unique name within the inside network. This unique name, in addition to the service identifier, IP addressing information and other information being mapped, may be registered with the DNS server 50 and shared with other devices 30, 32, 34, 36 connected to the inside network using DNS protocols. One of the second, third and fourth devices 32, 34, 36 may issue DNS queries to the DNS server 50, and receive corresponding DNS responses, in order to identify services being offered by the first device, thereby enabling service discovery across multiple routed networks 40, 42, 44 when one or more devices 30, 32, 34, 36 are unable to facilitate non-LAN-only service discovery protocols. This capability may be beneficial when the second, third and/or fourth devices 32, 34, 36 are configured to facilitate DNS and/or mDNS related operations at least in that it allows those devices to rely solely on DNS messaging to identify service originally broadcast over a separate LAN or multiple routed networks using mDNS.

The additional data field 106 of the DDNS message 74 may be populated with information mapped from corresponding additional data fields 104 of the mDNS message 72. This information is shown for exemplary non-limiting purposes to include IPv4 and/or IPv6 addresses and/or additional information related to those addresses such as TTL, type, and class. Additional information may also be carried within the additional data fields 104, 106 in order to facilitate association or storage within the resulting DNS record 76. The information stored in the DNS record 76 may be subsequently retrieved by other devices upon the DNS server 50 receiving a corresponding DNS query. FIG. 3 illustrates such a DNS query 88 being transmitted to the DNS server from the second device. The DNS query a may specify cabletv.myhouse.com within a corresponding RDATA field in order to facilitate identifying the corresponding record within the DNS zone. The DNS server 50 may then respond with a corresponding DNS response sufficient to identify the related service and addressing information necessary to facilitate communication between the first device 30 and the second device 32.

Figure 5:
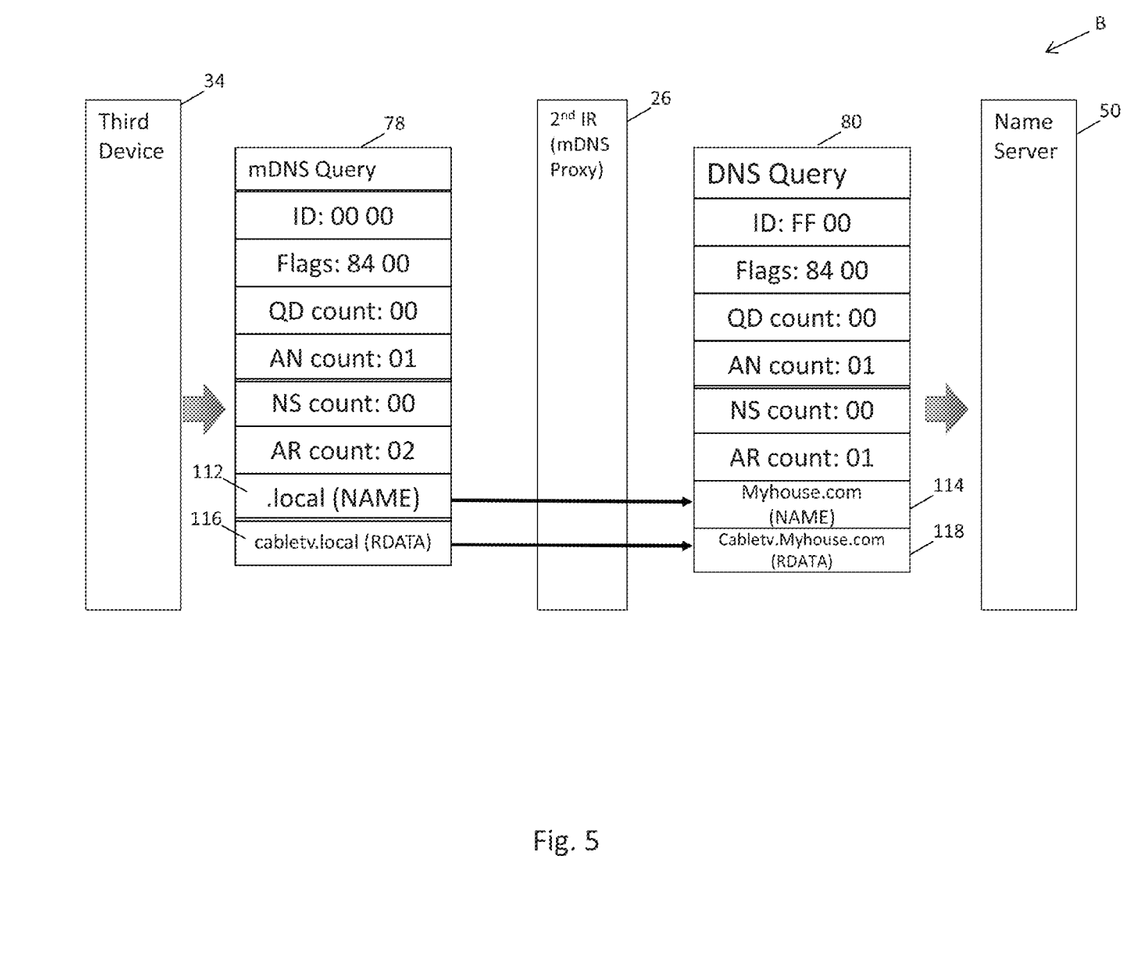
FIG. 5 illustrates an mDNS-to-DNS conversion B as contemplated by one non-limiting aspect of the present invention.

FIG. 5 illustrates an mDNS-to-DNS conversion B as contemplated by one non-limiting aspect of the present invention. The mDNS-to-DNS conversion B may correspond with facilitating the operations associated with callout B when an mDNS device, such as the third device 34, issues the mDNS query 78 regarding services associated with the first device 30. The mDNS query 78 may identify the ".local" of the first device 30 within a name field 112 and the "cabletv.local" of the first device 30 within a RDATA field 116. (As noted above, the use of ".local", "cabletv.local" and the other specific references herein are provided for exemplary non-limiting purposes as the present invention fully contemplates the first device using other host names and identifiers such that those identifiers may be used without deviating from the scope and contemplation of the present invention.) The mDNS query 78 may be processed at the second IR 26 with the second mDNS proxy 62 in order to generate the DNS query 80 necessary to retrieve the corresponding record from the DNS server 50. The second mDNS proxy 62 may generate the DNS query 80 with the network domain name as the name data field 114 instead of the mDNS specified ".local" name and with the "cabletv.myhouse.com" as the RDATA field 118 instead of the mDNS specified "cabletv.local" RDATA.

Figure 6:
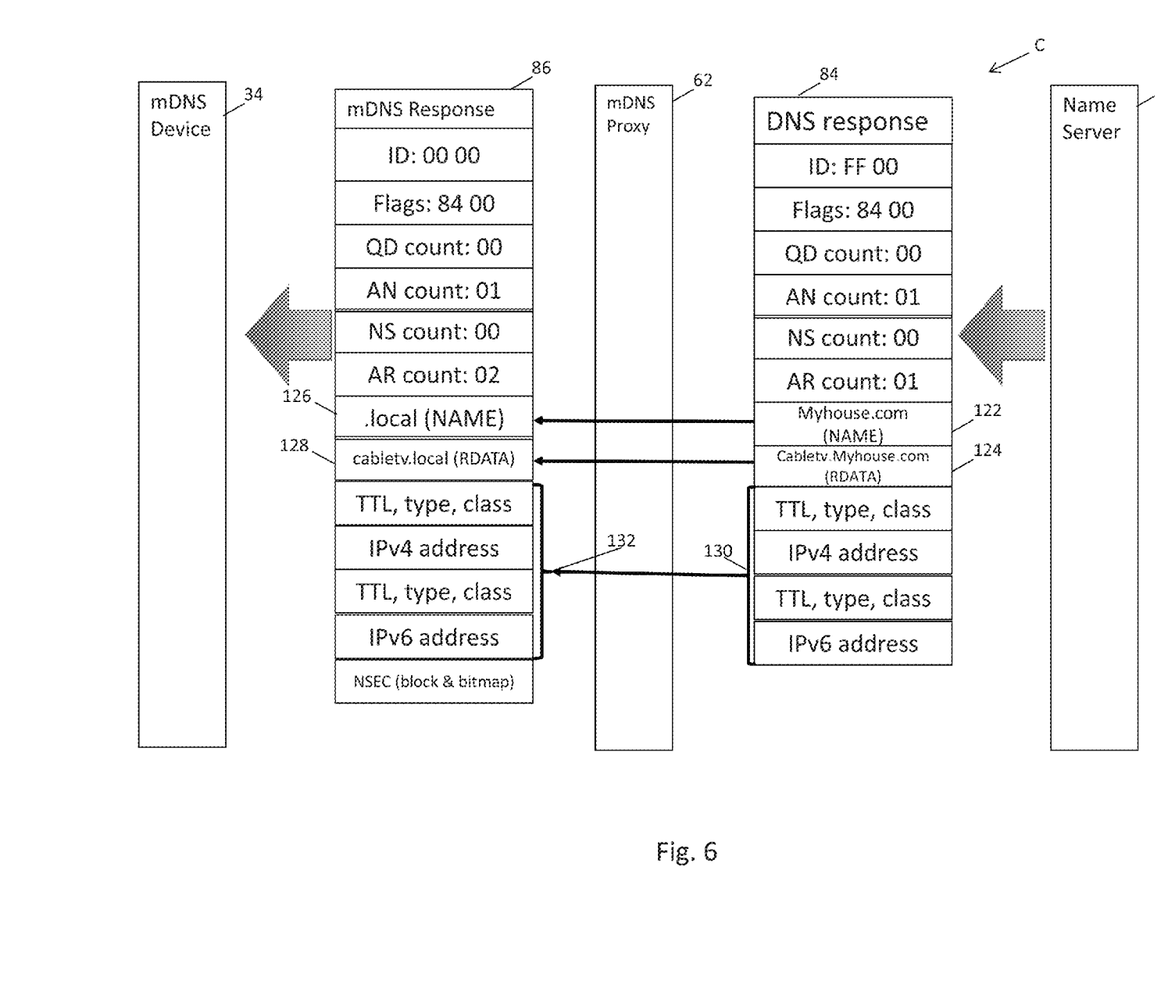
FIG. 6 illustrates a DNS-to-mDNS conversion C as contemplated by one non-limiting aspect of the present invention.

FIG. 6 illustrates a DNS-to-mDNS conversion C as contemplated by one non-limiting aspect of the present invention. The mDNS-to-DNS conversion C may correspond with facilitating the operations associated with callout C when the DNS server 50 generates the DNS response 84 to a DNS query issued for the first device (or other device registered from an unsolicited mDNS response), such as in response to the DNS query 80 generated above in FIG. 5 from the mDNS query 78 of the third device 34, i.e., when the DNS query originates from an mDNS depending device. The DNS response 84 may identify the network domain name, "myhouse.com", within the name field 122 and the unique name, "cabletv.myhouse.com", associated within DNS zone for the first device 30 as the RDATA field 124. The second mDNS proxy 62 may then convert the DNS response 84 to the mDNS response 86 required by the mDNS dependent third device 34. The mDNS response 86 may be generated by adding the ".local" or other default of the first device within the name field 126 and the "cabletv.local" or other default name with the RDATA field 128.

As demonstrated above, one non-limiting aspect of the present invention contemplates facilitating mDNS service discovery across independent LANs and/or multiple routed networks within a common network infrastructure, such as but not necessary limited to a home network. Conversions between mDNS formatted messaging and DNS formatted messaging may be performed in order to facilitate mDNS and/or DNS queries and responses. The foregoing may be characterized as a centralized service discovery process wherein the ER acts as a central repository or resolver for queries and responses. Once services are registered with the DNS server, i.e. through communication of a DDNS message or other configuration of the DNS server, further inquiries for the registered services may be directed upwardly to the ER for resolution. Alternatively, rather than requiring the DNS server to store all the records, the records may be distributed to the IRs with the ER coordinating recursive lookups across routed networks, e.g., DNS and/or mDNS queries and responses may be supported with a local IR rather than the ER. Advantageously, the mDNS-DNS conversions may be performed within existing protocol capabilities.

The mDNS-DNS conversion is described with respect to use of the mDNS proxy for exemplary non-limiting purposes as the present invention fully contemplates the use of other types of mDNS-DNS architectures. While the mDNS-DNS conversion is described with respect to the first IR, a second IR may include a similarly configured mDNS proxy to facilitate converting mDNS messages originating from the third devices. The mDNS proxies may be included within second or lower layers IRs (or gateways) as the need for such mDNS-DNS conversions may be unnecessary in single network or single link infrastructure within which mDNS message are capable of multicast to each commonly connected device. The mDNS proxy may be particularly beneficial as an automatically executing component or feature of home Internet Protocol (IP) network (HIPnet) routers or routers having off-the-shelf, default, pre-configured and/or consumer-level configurations, such as those that may be used in consumer/subscriber networks or small office and home office (SoHo) environments where such routers may be deployed by network novices or other individuals lacking ability or desire to program, adjust or otherwise manipulating router functionality.

One non-limiting aspect of the present invention contemplates a hybrid service discovery model sufficient to convert local mDNS messages to regular DNS to facilitate sharing with other networks in the home. Local-LAN devices that support LAN-only Service Discovery protocols like mDNS (or Bonjour) may have a corresponding mDNS messages converted to Standard DNS for devices within the other networks. One contemplated approach, referred to as a centralized approach, includes: an IR receiving a mDNS message from a device in the LAN with .local suffix (e.g., the corresponding payload may contain GUA/ULA address (es), E.g. host.local, AAAA, and 2001:db8::2); the IR updating its own Service-database, converting the mDNS records and then using DDNS to send the records to ER's standard DNS cache in preconfigured zone (e.g. example.com) whereby the conversion may result in host.example.com, AAAA and 2001:db8::2; and hosts may use Fully Qualified Domain Name (FQDN) for service/name discovery and contact the ER for Service and name Resolution for devices which are outside their own LAN. One contemplated approach, referred to as a distributed approach, includes: an IR receiving mDNS message from a device in the LAN with .local suffix (e.g., the corresponding payload may contain GUA/ULA address(es), E.g. host.local, AAAA, and 2001: db8::2); the IR adding records to its local standard DNS cache in preconfigured zone (e.g. example.com) whereby the conversion may result in host.example.com, AAAA, 2001:db8::2; and hosts using FQDN for service/name discovery; and the IRs and CER coordinating for recursive lookups across routed networks.

While the above described processes predominantly rely on default parameters selected by the first device or other device transmitting unsolicited mDNS message to advertise available services, other information may be used to facilitate the contemplated conversions and processes associated with supporting network wide DNS distribution, and when necessary, subsequent mDNS conversion of related queries and responses. The related conversions, for example, may be facilitated with use of a DNS Search List (DNSSL) contained in an IPv6 Router Advertisement message, as described in RFC 6106, the disclosure of which is hereby incorporated by reference in its entirety, e.g., to facilitate generation of the unique domain name assigned to the first device within the inside network. Optionally, the corresponding unique domain name may be selected as a function of listings included within DHCPv6 DNS Search List Option, as described in RFC 3646, the disclosure of which is hereby Incorporated by reference in its entirety. Optionally, the corresponding unique domain name may be selected as a function of options included within a DHCP Domain Name Option, as described in RFC 1533, the disclosure of which is hereby Incorporated by reference in its entirety.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A non-transitory computer-readable medium having non-transitory instructions operable with a first internal router (IR), the non-transitory instructions when executed with a processor of the first IR being sufficient to facilitate multiple network service discovery within an inside network, the inside network including a first local area network (LAN) interconnecting the first IR and a second IR with an edge router (ER), the ER interconnecting the inside network with an outside network such that all messaging between the inside network and the outside network routes through the ER, the inside network including a second LAN interconnecting the first IR with a first plurality of devices and a third LAN interconnecting the second IR with a second plurality of devices, the second LAN being independent of the third LAN such that messaging between the first and second plurality of devices routes through the first LAN, the non-transitory instructions being sufficient for:

determining a first multicast Domain Name System (mDNS) message multicasted from a first device of the first plurality of devices over the second LAN, the first mDNS message traveling no further than the second LAN such that the first mDNS message is unavailable to the second plurality of devices;

converting the first mDNS message to a Dynamic Domain Name System (DDNS) message, the DDNS message being sufficient for use with a name server of the ER to generate a first Domain Name System (DNS) record for the first device; and transmitting the DDNS message over the first LAN to the ER, thereby enabling the name server to generate the DNS record without receiving the first mDNS message from the first device.

2. The non-transitory computer-readable medium of claim 1 further comprising non-transitory instructions sufficient for:

determining a first DNS message transmitted from the name server over the first LAN, the first DNS message being associated with a second device of the second plurality of devices;

converting the first DNS message to a second mDNS message, the second mDNS message be sufficient for use with the first device to generate an mDNS record for the second device; and transmitting the second mDNS message over the second LAN, thereby enabling the first device to generate the mDNS record without receiving the first DNS message from the name server.

3. The non-transitory computer-readable medium of claim 2 further comprising non-transitory instructions sufficient for:

determining a third mDNS message transmitted from the first device over the second LAN, the third mDNS message being a query for services associated with the second device and traveling no further than the second LAN;

converting the third mDNS message to a second DNS message, the second DNS message being sufficient for use in querying the name server for the first DNS message; and transmitting the second DNS message over the first LAN to the ER, thereby querying the name server for the first DNS message without the name server receiving the third mDNS message.

4. The non-transitory computer-readable medium of claim 3 further comprising non-transitory instructions sufficient for converting the first mDNS message to the DDNS message by:

determining a network domain name of the inside network;

mapping a first name field included in the first mDNS message to a first zone field included in the DDNS message, including substituting a first name specified within the first name field by the first device with the network domain name such that the first zone field includes the network domain name and not the first name; and mapping a first RDATA field included in the first mDNS message to a first update field included in the DDNS message, including:

i) determining a first local suffix included as a part of a first domain name specified within the first RDATA field;

ii) generating a second domain name to be the network domain name plus a remaining part of the first domain name following removal of the first local suffix; and iii) specifying the second domain name within the first update field.

5. The non-transitory computer-readable medium of claim 4 further comprising non-transitory instructions sufficient for converting the first DNS message to the second mDNS message by:

mapping a second zone field included in the first DNS message to a second name field included in the second mDNS message, including substituting the network domain name specified within the second zone field with a second name associated with the second device such that the second name field includes the second name and not the network domain name; and mapping a second update field included in the first DNS message to a second RDATA field included in the second mDNS message, including:

i) determining a third domain name specified in the second update field for the second device;

ii) generating a fourth domain name to be a remaining part of the third domain name following removal of the network domain name included therein; and iii) specifying the fourth domain name within the second RDATA field of the second mDNS message.

6. The non-transitory computer-readable medium of claim 5 further comprising non-transitory instructions sufficient for converting the third mDNS message to the second DNS message by:

mapping a third name field included in the third mDNS message to a third zone field included in the second DNS message, including substituting the first name specified within the second name field by the first device with the network domain name such that the first zone field includes the network domain name and not the first name; and mapping a third RDATA field included in the third mDNS message to a third update field included in the second DNS message, including specifying the second domain name within the third update field.

7. The non-transitory computer-readable medium of claim 5 further comprising non-transitory instructions sufficient for determining the second name as a function of relationship information transmitted from the second IR over the first LAN.

8. A method of facilitating discovery in a network having an edge router (ER), a plurality of internal routers (IRs) and a plurality of devices, at least a first portion of the devices being connected downstream to a first IR and at least a second portion of the devices being connected downstream to a second IR, the first IR being connected downstream to the ER via a first link and the second IR being connected downstream to the ER via a second link, the method comprising:

the first IR receiving a multicast Dynamic Name System (mDNS) message from a first device within the first portion, the first mDNS message associating the first device with an IP address and a first domain name;

the first IR updating a first service-database with a first record sufficient for associating the first device with the first IP address and a second domain name, the first IR generating the second domain name by appending a third domain name of the ER to the first domain name;

the first IR transmitting a Dynamic Domain Name System (DDNS) message to a name server of the ER, the first DDNS associating the first device with the first address and the second domain name;

the first IR transmitting the DDNS message to the name server without:

i) communicating the mDNS message to the ER over the first link;

ii) communicating the mDNS message to the second IR; and iii) communicating the mDNS message to the second portion of the devices; and the first device transmitting the mDNS message to each of the other devices within the first portion over a third link interconnecting each of the first portion of the devices with the first IR, the third link being independent of the a fourth link interconnecting each of the second portion of the devices with the second IR.

9. The method of claim 8 further comprising the name server generating a second record in response to receipt of the DDNS message, the second recording associating the first device with the first address and the second domain name.

10. The method of claim 8 wherein the first domain name includes a default suffix determined by the first device.

11. The method of claim 8 wherein the third domain name is determined by the first IR based on one of:

a DNS Search List (DNSSL) contained in an IPv6 Router Advertisement message;

a DHCPv6 DNS Search List Option; and a DHCP Domain Name Option.

12. The method of claim 8 further comprising:

the name server generating a DNS record in response to the DDNS message sufficient for associating the first device with the first address and the second domain name;

the second IR receiving an mDNS query from a second device within the second portion;

the second IR converting the mDNS query to a Domain Name System (DNS) query;

the second IR transmitting the DNS query to the ER;

the name server providing the DNS record to the ER in response to the DNS query;

the ER including the DNS record in an DNS response transmitted to the second IR in response to the DNS query; and the second IR converting the DNS response to an mDNS response including at least the first address and the second domain name included with the DNS record; and the second IR transmitting the mDNS response to the second device, thereby providing the second device with the first address and the second domain name without the second device receiving the first mDNS message.

* * * * *